July 15, 1924.
A. KURNICK
1,501,461
FOCUS RANGE FINDER FOR CAMERAS OR THE LIKE
Filed Nov. 20, 1922
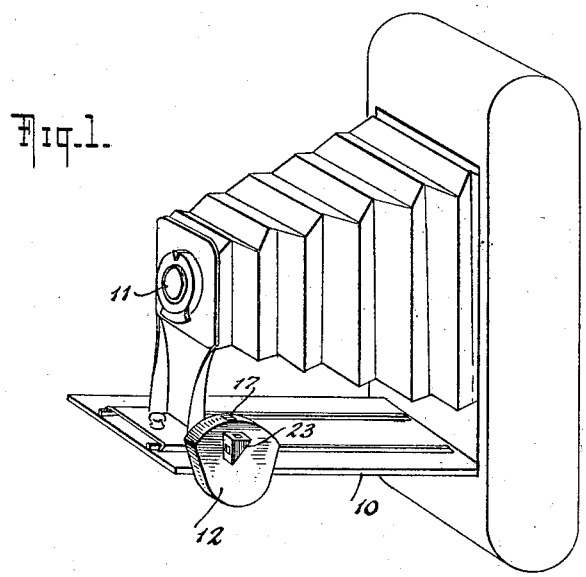
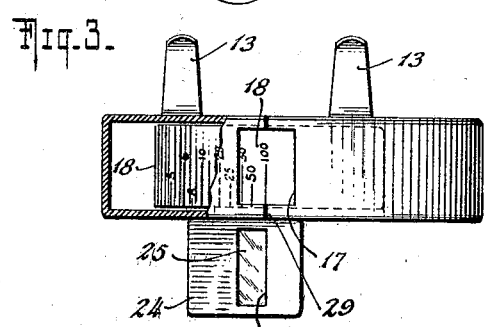
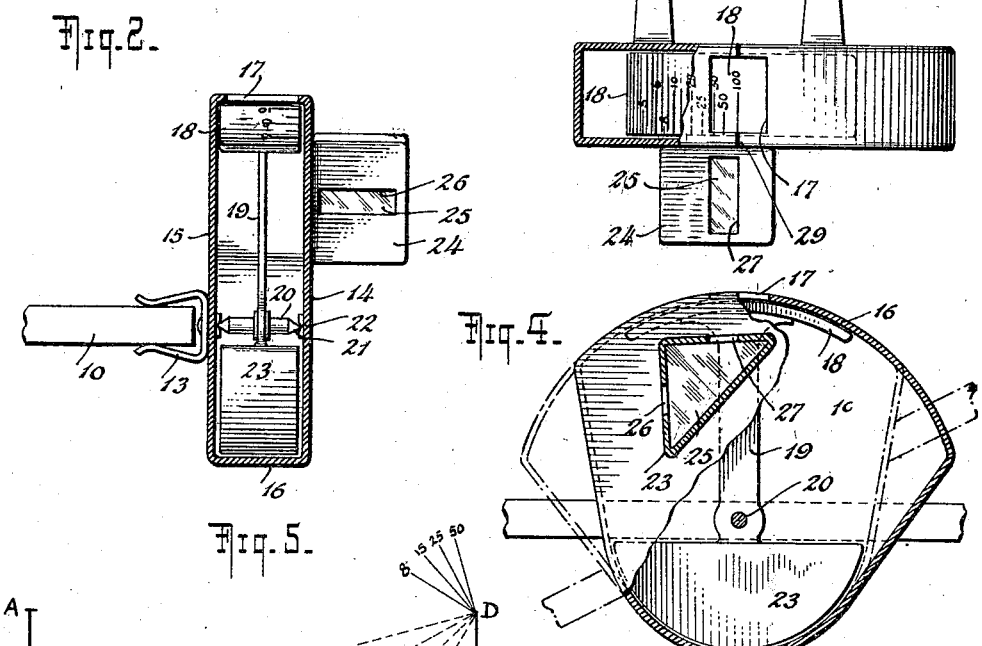
INVENTOR
ABRAHAM KURNICK
ATTORNEYS Patented July 15, 1924.

1,501,461

UNITED STATES PATENT OFFICE.

ABRAHAM KURNICK, OF BROOKLYN, NEW YORK, ASSIGNOR OF ONE-HALF TO LOUIS KURNICK, OF NEW YORK, N. Y.

FOCUS RANGE FINDER FOR CAMERAS OR THE LIKE.

Application filed November 20, 1922. Serial No. 602,043.

*To all whom it may concern:*

Be it known that I, ABRAHAM KURNICK, a citizen of the United States, residing at Brooklyn, county of Kings, and State of New York, have invented certain new and useful Improvements in Focus Range Finders for Cameras or the like, of which the following is a specification.

In the use of cameras provided with means for focusing the cameras for objects at different distances from the camera, considerable difficulty is experienced in determining the correct distance of the object, which frequently results in the spoiling of the negative through improper focusing and while I am aware that devices have been constructed for determining the distance of the object from the camera, such devices are complicated in construction and therefore costly to manufacture and their use also involves accurate manipulation, difficult for the average person to either understand or practice. Furthermore, such devices with which I am familiar are not adapted to be attached to an existing camera but must be incorporated in the camera in the course of its manufacture.

The principal object of this invention is therefore to provide a device adapted to overcome the above objections which will be simple in construction and use and which may readily be attached to an existing camera for determining with sufficient accuracy the distance from the camera of the object to be photographed.

Another object is to provide a device of this character provided with indicating means from which the distances may be read directly and which indicating means is actuated by the force of gravity as the angle of inclination of the camera to the horizontal is varied.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a perspective view of a camera showing an attachment embodying my invention and a manner in which the device is secured to the camera.

Fig. 2 is a substantially central vertical section taken through the attachment.

Fig. 3 is a plan view of the attachment shown in Figs. 1 and 2.

Fig. 4 is a view in side elevation of the attachment, showing the casing partly broken away and the view finder in section.

Fig. 5 is a diagrammatic view illustrating the principle underlying my invention.

Referring to the drawings, 10 represents the board of the camera upon which the lens 11 is slid in the usual manner. My focus range finder which is represented by the numeral 12 is provided with any suitable means such as the spring clips 13, by means of which the range finder may be detachably secured to the board 10. A suitable embodiment of my invention as shown may consist of the casing 12, having the spaced side walls 14 and 15 connected by the transverse wall 16. The upper face of the transverse wall is cut out as at 17 to provide an observation window through which an indicating scale 18 is visible. The indicating scale 18 is mounted on the upper end of an arm 19 which is mounted upon a pintle 20 provided at its ends with centers 21 which are pivotally mounted in the centers 22 provided in the side walls 14 and 15. Secured to the lower end of the arm 18 is a weight 23, which is adapted to swing the arm 19 and indicating scale 18, as the angle of inclination of the camera to the horizontal is varied, the arm 19, weight 23, and indicating scale 18 forming in effect a freely mounted pendulum.

Mounted on the side wall 14, adjacent the upper end of the wall is a casing 24, in which is mounted an optical prism 25, the front wall of the casing being provided with a narrow elongated slot 25 and the top wall with a similar slot 26. The casing 24 and prism 25 are so mounted upon the side wall 14 as to locate the slot 27 in substantial alignment with the cut out portion 17, and I have found that the preferred location is to locate the rear end of the slot 27 in alignment with the center of the cut out portion 17. The top of the wall 15 is provided with a register mark 29, which mark, the rear end of slot 27 and the axis of the pintle 20 are preferably arranged in the same vertical plane. The scale 18 is provided with suitable graduations and figures to indicate the various distances to be determined. It will be noted that the lower part of the casing 12 is curved about an arc having its center at the axis of the pintle 20 to permit the weight 23 to swing freely upon the pintle.

It will be obvious if the front slot 26 of the prism casing be directed towards an object, that the image of the object will appear at the top slot 27 in accordance with the well known properties of the optical prism. The mode of operation and manner of using my improved focus range finder is as follows, let it be assumed that the object to be photographed is represented by the line A—B in Fig. 5. The camera with the range finder attached thereto is held before the body of the photographer in the usual manner, whom it may be assumed is standing at a distance of 50 feet from the object the position of the photographer being represented by the line C—D. The camera is then inclined to direct the slot 26 towards the base line of the object so as to secure an image of the base line in the slot 27. As the camera is inclined from the horizontal, the casing 12, will be moved towards the dotted line position shown in Fig. 4, the weight 23 will cause the arm 19 to swing upon its pivotal mounting thus causing the indicating scale to swing from the full line position towards the dotted line position, thus bringing a new graduation mark opposite the register mark 29, which graduation for the particular case assumed would be the graduation marked 50.

As the camera in common use only need to be adjusted for distances less than 100 feet, the graduation 100 is located upon the scale 18 to align with the register mark 29 when the camera is held in a horizontal position. It will be obvious that for distances less than 100 feet the inclination of the camera will have to be changed in inverse proportion to the respective distance in order to obtain the base line image of the object, the inclination increasing as the distance increases. Each distance as indicated in Fig. 5 will have a corresponding inclination of the camera and as the pendulum will always be maintained in a vertical plane by the effect of the weight 23, the proper adjustment of the lens is readily obtained by graduating the scale to indicate the proper distance of an object corresponding to a certain inclination of the camera.

Fig. 5 indicates the differences of inclination as shown by the lines B D, E D, F D, and C D corresponding to the distances 50, 25, 15 and 8 feet respectively. The differences in the height at which the camera would be held would differ with the height of various individuals but such differences in height would under ordinary conditions be confined to variations not over six inches above or below a certain mean position which variations would make such a slight difference in the angular measurements that the desired measurements may be obtained with sufficient accuracy to enable the lens to be focused within the limits required for a clear sharp negative.

The pintle 20 is placed nearer to the weight 23 than to the scale 18, thereby providing a difference in lever arms which will produce a greater movement of the scale for a given movement of the weight, thus enabling the graduations to be placed further apart for greater accuracy and more convenient observation.

It will be understood that if desired the scale might be formed upon the casing and a pointer substituted for the movable scale also that a system of weighted gear wheels could be substituted for the simple pendulum, and that any suitable means for attaching the range finder could be substituted for the clips 13. It will be further understood that the device can also if desired be constructed as a permanent constituent part of the camera in the course of manufacture instead of as an attachment.

Instead of using an optical prism as shown a lens and mirror could obviously be substituted.

Having thus described my invention, what I claim as new and desire to secure by Letters Patent, is:—

1. A focus range finder forming a unitary attachment for cameras or the like comprising a casing, optical means carried by the casing and adapted to reflect the image of the base line of an object, said optical means having a relatively narrow slot through which said base line image may be observed, indicating means carried by the casing arranged to function proportionately to the movement of and for joint consideration with said optical means as the latter is inclined from the horizontal, and means carried by the casing alone sufficient to secure the latter to a camera.

2. A focus range finder forming a unitary attachment for cameras or the like comprising a casing, optical means carried by said casing and adapted to reflect the image of the base line of an object, an indicating means carried by said casing for joint observation and consideration with said optical means and arranged to move relatively to said casing as the latter and optical means are inclined from the horizontal, and means carried by the casing alone sufficient to secure the latter to a camera.

3. A focus range finder forming a unitary attachment for cameras or the like comprising a casing, optical means carried by said casing at one side thereof and adapted to reflect the image of the base line of an object, an indicating means carried within the casing for joint observation and consideration with said optical means and arranged to move by gravity relatively to said casing as the latter and optical means are inclined from the horizontal, and means carried by the casing on the side thereof opposite to the optical means alone sufficient to secure the latter to a camera.

In testimony whereof I have affixed my signature.

ABRAHAM KURNICK.